Nov. 26, 1940.   V. V. MALCOM   2,223,083

MOLDING PLATE FOR JOINT STRUCTURES

Filed Oct. 1, 1936   2 Sheets-Sheet 1

INVENTOR.
VINCENT Y. MALCOM
BY
ATTORNEY.

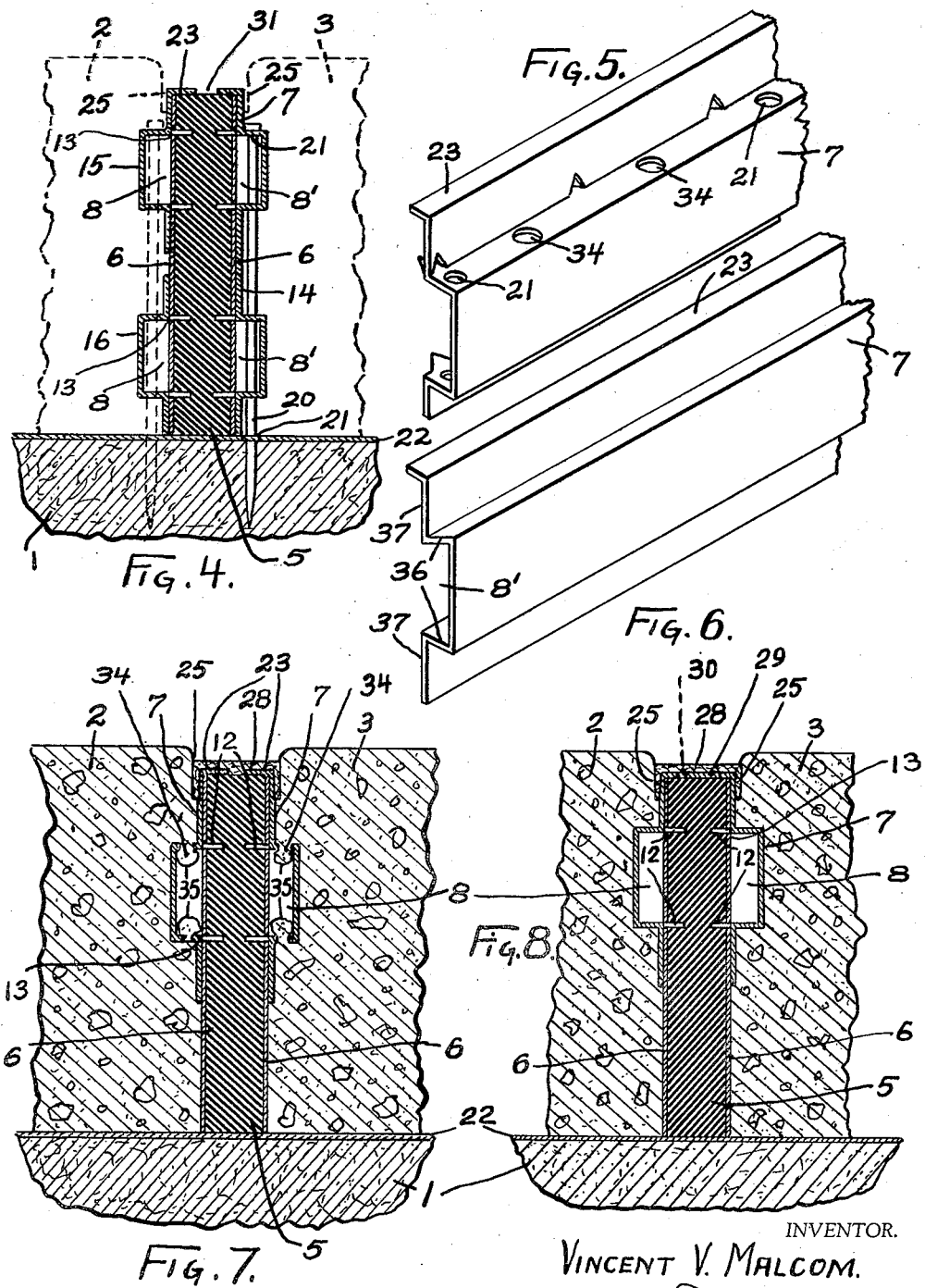

Patented Nov. 26, 1940

2,223,083

UNITED STATES PATENT OFFICE 2,223,083

MOLDING PLATE FOR JOINT STRUCTURES

Vincent V. Malcom, Mariemont, Ohio, assignor to The Philip Carey Manufacturing Company, a corporation of Ohio Application October 1, 1936, Serial No. 103,549

1 Claim. (Cl. 94—18)

This invention relates to building structures and particularly to such structures which comprise spaced apart rigid sections having a joint or filler strip inserted therebetween to provide for contraction and expansion of said sections and also to seal the joint space against infiltration of earth, incompressible materials, and other foreign substances into the joint space.

It particularly relates to a molding and reservoir forming plate or plates employed in conjunction with an expansion joint unit for molding the ends of the sections with a reservoir or reservoirs provided in the construction adjacent the joint or filler strip for receiving a portion of said strip which is displaced by compression of the sections.

This case is a continuation-in-part of my application Ser. No. 10,018, filed March 8, 1935, and that application is incorporated herein as a part of the present disclosure to show the different ways of assembly for the improvement which is the subject of the instant case.

For a better understanding of the invention, reference may be made to the accompanying drawings, in which:

Figs. 1, 2, 3, 4, 7 and 8 are cross-sections of paving sections showing embodiments of the invention which are shown and claimed in the above mentioned case;

Fig. 5 is a perspective view of the plate shown in Fig. 3 that is adapted to be applied to the side or sides of the joint strip; and Fig. 6 is a perspective view of a modified form of plate which is the subject of this application.

Figure 1:
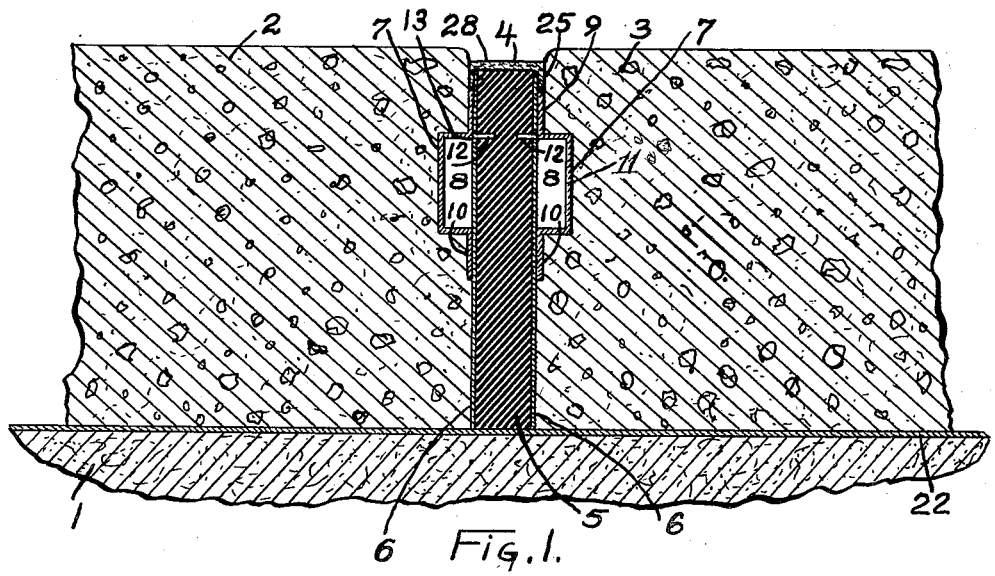

Referring specifically to the drawings in which like numerals are used to designate like parts, numeral 1 designates a foundation or subgrade of any suitable material graded to receive a surfacing layer of concrete or other suitable material superposed thereon, said surfacing structure preferably being composed of paving sections 2 and 3 which at desired spaced intervals are separated by an expansion joint structure designated herein generally by numeral 4. The expansion joint structure is typified by a composition strip 5 which is of the character of ductile bituminous material, such as asphalt, tar, pitch and the like either with or without fibrous materials. Inasmuch as this material is preferably soft for efficient operation when placed within the joint it is preferably manufactured with reinforced sides 6 such as paper, felt or the like which is also preferably waterproofed by some suitable saturant. It will, of course, be understood, however, that the invention is not limited to an expansion joint strip which is faced with reinforced strip, for a suitable strip may be provided which is internally reinforced by fibrous or other filling ingredients or the strip may also be reinforced by foundation sheet or sheets like sheets 6 embedded within the mass. One or both sides of the strip 5 may have associated therewith a plate 7, of any suitable material having the desired rigidity, stamped or otherwise formed with a recess or reservoir 8 adjacent joint strip engaging faces 9 and 10. This plate may be composed of any suitable material having sufficient strength to act as a form for molding the concrete. It is typified herein by a metal strip of copper, steel or the like.

The various embodiments illustrate plates of similar constructions applied to both sides of the joint strip, but it will be understood that they may be applied to only one side of the strip if desired. This recess or reservoir may be of any shape or contour but it is believed preferable to have the adjoining portion between the reservoir and the joint strip engaging portions such that the angles adjacent the embossment on the outside of the strip are 90 degrees or less. This always provides continuous contact between concrete over the reservoir and the extruded asphalt in the reservoir during contraction of the paving sections, thereby at all times effecting protection against infiltration of foreign matter. The portion which is stamped to provide the reservoir on one side of the strip also provides an embossment 11 on the opposite face for interengaging with the adjacent end of the paving section. It is also preferable to have the plate provided with means for attaching same to the joint strip, thereby permitting the strip to be readily assembled at the time of installation or the plate and joint strip may be assembled as a unit at the place of manufacture. To effect this, the strip may be provided with a suitable impinging means, typified herein by tongues 12 which may be stamped from the plate. These tongues may be provided on any part of the plate which engage with the strip but are preferably formed at the juncture of the reservoir portion and the strip contacting portions in order that they may also function to cut and weaken the felt or other reinforcement if same be used on the joint strip. Thus the felt is caused to separate and break at predetermined places 13 during the compression of the joint strip between the paving sections without impairing or resisting deformation of the joint strip.

While the reservoir plates may be employed only on one side of the strip, it is believed preferable to have them provided on both sides. Also one or more plates may be applied on the same side of the strip, these being in the form of a single plate with a plurality of reservoirs, or separate plates may be used, each of which provides one reservoir. Numeral 14, Fig. 4, designates a single plate formed with a plurality of continuous channels or reservoirs 8' on one side of the joint strip. The other side of the joint strip is provided with two separate strips 15 and 16 each of which is of substantially the same construction and together are of the same construction as plate 14 except that they are separate rather than integral. The channels or reservoirs are not necessarily continuous but might be in the form of several individual reservoirs. In order to conveniently install the joint strip and plates within the pavement the strip may be conveniently supported on a holder or base plate 17 which is formed from a strip of flexible metal having portions crimped therefrom to provide flanges 18 with an intervening space 19 which will be of substantially the same width as the expansion joint strip. The expansion joint strip is mounted upon the base plate with the bottom edge fitted within the recess and the strip and plates are secured to the foundation by any suitable staking means 20 which are projected through perforations 21 provided in the plates, the base plate and into the subgrade. In some types of structures, such as pavements, for example, it is desirable to have a waterproofing protective layer interposed between the subgrade and the surfacing paving sections and this is typified in the present instance by sheets of saturated felt laid over the subgrade to provide a continuous waterproofing layer 22.

These various modifications of plates are suitable to be applied to the side or sides of the joint strip to provide recesses or reservoirs. These may, if desired, be advantageously provided with an overturned flange 23 which is adapted to fit partially over the top edge of the joint strip. After the expansion joint has been installed, the concrete is poured, smoothed and edged adjacent to the joint with a finishing or edging tool that cuts away the concrete superposed upon and overlying the joint strip and rounds off the corners of the adjacent paving sections. A conventional edging tool is provided with a trowel surface having a lip on one edge so that the trowel surface may be guided by the lip engaging the side face of the joint strip or the plate attached thereto. Subsequently to this finishing and the removal of the concrete overlying the joint strip, there may be left a space slightly greater than the width of the joint strip with shallow grooves 25 on each of the top edges of the joint strip and bituminous material may be poured within the space to provide a sealing layer or cap 28 over the joint strip and filling the grooves 25.

In Fig. 8 the plates are combined into an integral structure to form a cap 29 which fits over the top edge of the joint strip. This structure in addition to providing the reservoir plates also serves to cap the exposed edge of the joint strip. The top edge or cap portion may be preferably imperforate or provided with any number of recesses 30 and these may be of any desired size and shape. They permit extrusion of the expansion joint strip and function in substantially the same manner as does the space 31 which is between the overlapping ends of the plates in Fig. 4, and others but it is believed that they will more positively retard extrusion until after the reservoirs in the side plate or plates have been completely filled.

By means of the projections 12, the plate or plates may easily be secured to and held in position upon the joint strip and if the joint strip be covered with the facing sheets 6 they also serve to weaken those facing sheets along predetermined lines and cause the sheets to separate and break away as compression takes place, thereby permitting the joint material between the facings to readily flow into the reservoir or reservoirs. It may be preferable to have the breaks in the facing sheets occur only at the upper point of the reservoir, thereby permitting the bituminous core to begin first to fill at this point and effect a sealed joint sooner than would happen without the felt being broken or weakened. A slight extrusion takes place vertically, and the space above the edge of the joint is partially filled. As the strip extrudes and flows upwardly it removes any dirt and other foreign material which may have become settled in this space.

If the paving be laid during the summer months compression will result almost immediately and perfect the seal. However, installation conditions or temperatures might conceivably create circumstances causing contraction before a seal has been perfected by extrusion of the joint into the reservoir or reservoirs, particularly where the paving has been installed during or just preceding the winter months. In this case a temporary seal is desirable until weather conditions are such as to cause extrusion of the joint into the reservoir, thereby effecting a permanent seal. This temporary seal is effected by overlapping a portion of the plate over the top edge of the joint material as illustrated by the overturned flanges 23 above described. The result is also accomplished by a cap which is used separately or as an integral with the plate or plates as above described and illustrated in Fig. 8. During subsequent compression, it is possible that because relatively light material is used the overturned flanges 23 may be forced upwardly as a result of extrusion and may possibly be ultimately flattened out against the edges of the respective paving sections. If this should occur, it would take place during extrusion, and they will have in the meantime served their function as a temporary seal.

Figures 2, 3:
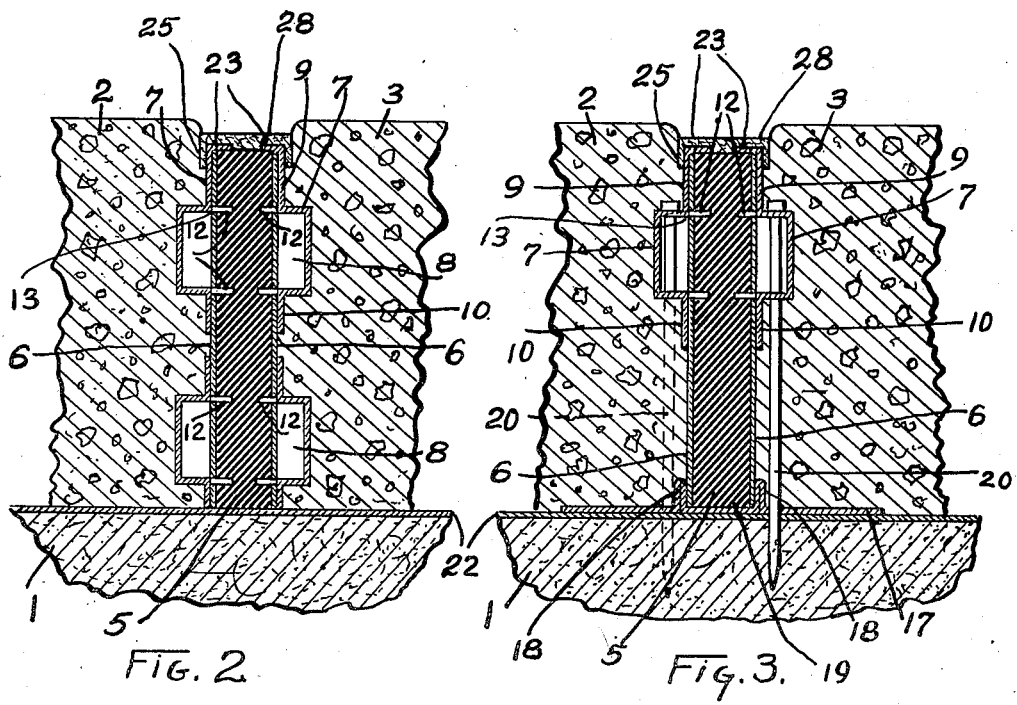

The plates may be assembled with the joint strip and shipped as a unit, or they may be handled separately and then applied at the time the joint structure is formed in the pavement. These plates, as above described, may be recessed at spaced intervals to receive stakes 20 provided with a pointed end for being driven into the subgrade 1. Stakes may be used for installing the joint structure whether one plate (Fig. 3) or two plates (Fig. 4) be used on each side.

In addition to the recesses formed in the channel portion of the strip there also may be recesses 34 in order that the said strip may be positively interlocked with the concrete material, for when the concrete material is poured (Fig. 5) a portion of it will project through the recesses in the strip to form anchoring portions or buttons 35 (Fig. 7).

Another construction, which is the subject of this application, for effecting interlocking relation with the end of the paving section is shown in Fig. 6 wherein the side walls 36 are chamfered or inclined at an angle to the face portions 37 of the plates that abut the filler strips. This provides a reservoir 8' having a constricted neck portion adjacent the face portions of the plate. By this construction interlocking engagement with the ends of the paving sections is obtained by the contour of the walls rather than by any extra means, such as the recesses 21, although if desired these recesses may be employed in addition to the inclined walls.

While I have shown the various embodiments of my earlier filed case and the improved form of this case, and described them in detail, it will be understood that there may be various changes without departing from the spirit of the invention.

I claim:

An elongated plate adapted for use in expansion joints between an expansion joint strip and a paving section comprising a base portion and a projection means on one side both engaging with a paving section, a normally empty and open reservoir on the one side of the plate opposite the projection, and walls common to both the projection and reservoir cambered to provide a constricted neck portion for the reservoir and an enlarged base portion for the projection.

VINCENT V. MALCOM.